(12) United States Patent
Hess et al.

(10) Patent No.: US 9,429,261 B2
(45) Date of Patent: Aug. 30, 2016

(54) PLUG CONNECTION FOR FLUID LINES AND RETAINING PART FOR SUCH A PLUG CONNECTION

(71) Applicant: VOSS Automotive GmbH, Wipperfurth (DE)

(72) Inventors: Jochem-Andreas Hess, Wipperfurth (DE); Gunter Sieper, Remschied (DE); Reinhard Plietsch, Wermelkirchen (DE)

(73) Assignee: VOSS Automotive GmbH, Wipperfurth (DE)

( * ) Notice: Subject to any disclaimer, the term of this patent is extended or adjusted under 35 U.S.C. 154(b) by 117 days.

(21) Appl. No.: 13/895,866

(22) Filed: May 16, 2013

(65) Prior Publication Data

US 2013/0313820 A1 Nov. 28, 2013

Related U.S. Application Data

(60) Provisional application No. 61/666,012, filed on Jun. 29, 2012.

(30) Foreign Application Priority Data

May 16, 2012 (DE) .................... 10 2012 104 288

(51) Int. Cl.
*F16L 39/00* (2006.01)
*F16L 37/12* (2006.01)
*F16L 37/14* (2006.01)

(52) U.S. Cl.
CPC ............ *F16L 37/12* (2013.01); *F16L 37/1225* (2013.01); *F16L 37/144* (2013.01)

(58) Field of Classification Search
CPC .......................... F16L 37/0841; F16L 37/086
USPC ........................... 285/86, 305, 319, 321, 921
See application file for complete search history.

(56) References Cited

U.S. PATENT DOCUMENTS

| | | | | |
|---|---|---|---|---|
| 3,603,621 A | * | 9/1971 | Parsons | F16L 31/00 285/148.13 |
| 5,005,878 A | * | 4/1991 | Smith | F02M 55/004 285/319 |
| 5,048,875 A | * | 9/1991 | Usui | F16L 37/0985 285/319 |

(Continued)

FOREIGN PATENT DOCUMENTS

DE 10 2005 038 439 A1 2/2006
WO 03/040607 A1 5/2003

(Continued)

*Primary Examiner* — Aaron Dunwoody
(74) *Attorney, Agent, or Firm* — Eric J. Sosenko; Jonathan P. O'Brien; Honigman Miller Schwartz and Cohn LLP

(57) ABSTRACT

A plug connection having two intermateable coupling parts that can be releasably locked via a locking device. The locking device includes a radial retaining bar on each of the coupling parts and a retaining part with a circumferentially closed annular contour. In a preassembled state, the retaining is undetachably assembled on one of the two coupling parts. In an assembled state, the retaining part axially and radially encompasses the retaining bars of both coupling parts. The retaining part includes an elastically moving retaining section having a C-shaped section defined by two collars. The collars have different sizes and/or shapes such that one collar releases an adjacent retaining bar upon the radial elastic outward movement out of the assembled state. The other collar remains engaged behind the retaining bar of the other coupling part.

17 Claims, 12 Drawing Sheets

(56) References Cited

U.S. PATENT DOCUMENTS

| | | | | |
|---|---|---|---|---|
| 5,374,084 A * | 12/1994 | Potokar | F16L 37/08 | 285/27 |
| 5,540,463 A * | 7/1996 | Potokar | F16L 37/1225 | 285/319 |
| 5,735,555 A * | 4/1998 | Answine | F02M 55/004 | 285/319 |
| 6,328,349 B2 * | 12/2001 | Bandlow | | 285/319 |
| 6,655,491 B1 * | 12/2003 | Stoll | B62D 5/062 | 180/417 |
| 7,393,019 B2 * | 7/2008 | Taga | F16L 33/227 | 285/321 |
| 7,828,338 B2 | 11/2010 | Kertesz et al. | | |
| 7,984,931 B2 * | 7/2011 | Kertesz | F16L 47/12 | 138/109 |
| 8,662,543 B2 * | 3/2014 | Lechner | F16L 37/0982 | 285/308 |
| 2001/0040377 A1 * | 11/2001 | Bandlow | F16L 37/0985 | 285/319 |
| 2004/0232696 A1 * | 11/2004 | Andre | F16L 37/0985 | 285/319 |
| 2005/0167980 A1 * | 8/2005 | Bauer | F16L 37/0985 | 285/308 |
| 2006/0049630 A1 * | 3/2006 | Bilstein | F16L 37/1225 | 285/321 |

FOREIGN PATENT DOCUMENTS

| | | |
|---|---|---|
| WO | 2006/018384 A1 | 2/2006 |
| WO | 2009/156399 A1 | 12/2009 |

* cited by examiner

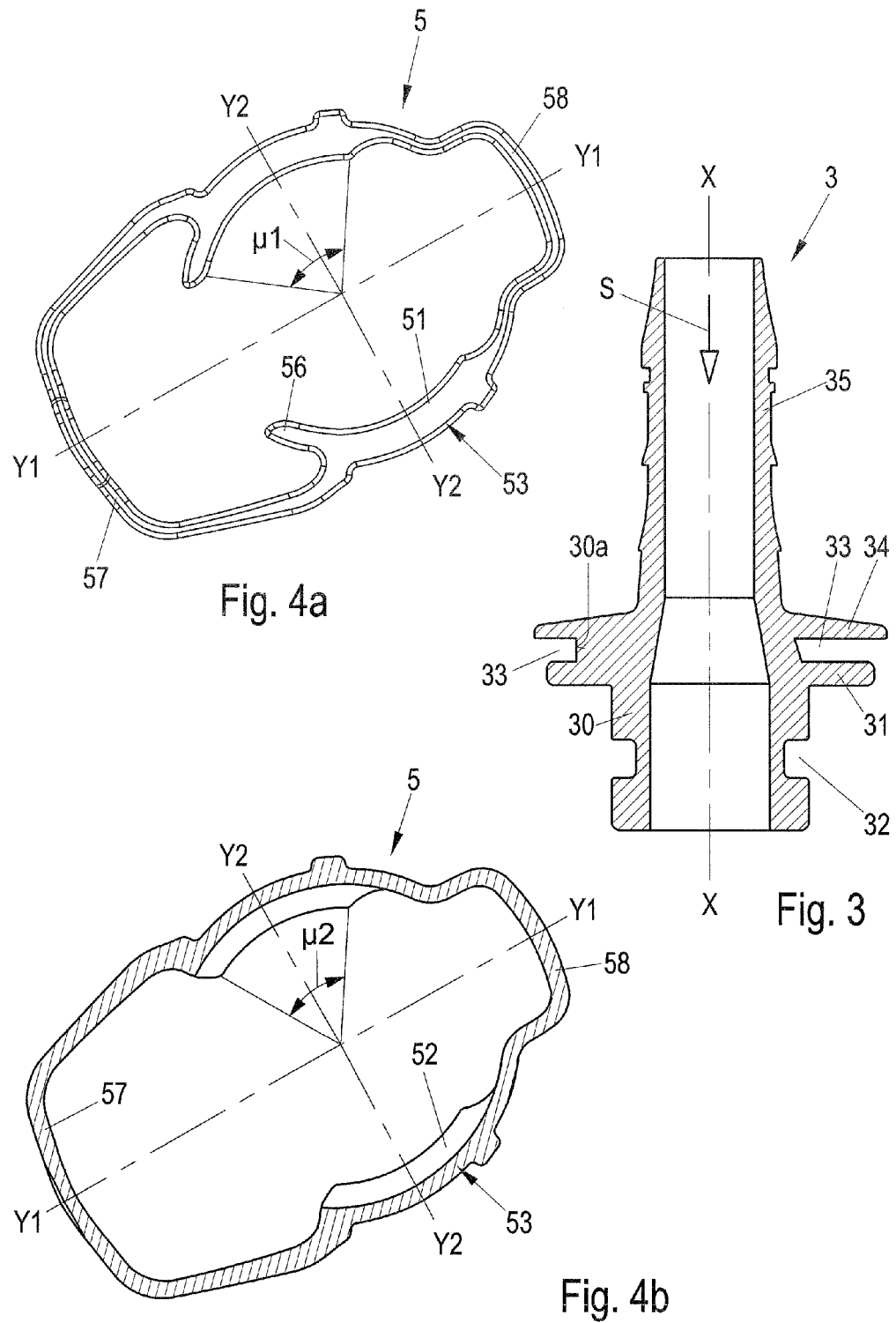

PLUG CONNECTION FOR FLUID LINES AND RETAINING PART FOR SUCH A PLUG CONNECTION

CROSS REFERENCE TO RELATED APPLICATIONS

This application claims the benefit of U.S. Provisional Application No. 61/666,012 filed on Jun. 29, 2012, the entire contents of which are hereby incorporated by reference.

BACKGROUND

1. Filed of the Invention

The invention relates to a plug connection for fluid lines, comprising two intermateable coupling parts, which in the inserted state can be releasably locked.

2. Related Technology

The invention relates to a retaining part for a plug connection.

A plug connection is known, from WO 2006/018384 A1, in which a known locking principle is assumed, according to which a C-shaped retaining section of a retaining part positively encompasses retaining bars of coupling parts and is fixed in this way. In order to reduce the danger of detachment of the retaining part and simplify the assembly, in particular also in applications in which the assembly location only has a small surrounding space available, or in which at least one valve is to be integrated into the coupling parts, it is provided that, firstly, the retaining part is configured in such a way and is undetachably preassembled or preassemblable in such a way that it is axially fixed with little play and radially undetachably fixed, and, secondly, is radially elastically movable in the area of the retaining section. The retaining part in the area of the retaining section, as well as the retaining bar of the other coupling part, must be configured in adaptation to each other in order to form a positive snap-on connection acting in insertion direction, in such a way that the retaining section is moved radially outwardly by the retaining bar moving relative thereto when the coupling parts of the retaining section are plugged into each other and subsequently encompasses the retaining rods of the two coupling parts for locking purposes by means of the radial return movement toward the inside in inserted state. The retaining part is preferably configured as a one-piece annular part having an axially and radially continuous slot interruption at a point of the periphery. This known plug connection makes possible an easy, fast and convenient as well as also secure single-hand assembly. In order to reduce the danger of detachment when the retaining part is detached from the coupling parts, WO 2006/018384 provides to undetachably connect the retaining part to a coupling part via an additional, in particular ribbon-like or string-like retaining element attachable at one end to the coupling part and at the other end to the retaining part.

A plug connection of the kind described above is also known from WO 2009/156399 A1. In this document, the additional retaining element is considered disadvantageous. In order to facilitate a positioning of the retaining part and the reassembly with a low danger of detachment of the retaining part with reduced complexity, while eliminating such an additional retaining element, the retaining part is provided with a ring-shaped configuration, wherein the retaining part is fixed on at least one of the two coupling parts with a circumferentially closed annular contour in a preassembled state and encompasses at least one of the two coupling parts in assembled state. The retaining part can at the same time be preferably undetachably preassembled on a plug part, wherein it can be fixed in two positions, the preassembly position and the assembly position. It arrives from the preassembly position into the assembly position by means of a radial displacement or for disassembly from the assembly position back into the original position by means of a mutually opposite displacement. In this respect a configuration is preferred with which an annular opening enclosed by the annular contour is formed by a first circular partial opening with a central point in the area of the retaining section, and a second circular partial opening, whose central point is located within a retaining section of the retaining part, wherein the two partial openings intersect. The retaining part has necessarily an enlarged radial extension, which is considered particularly disadvantageous when only very little assembly space is available.

SUMMARY

It is an object of the invention to improve a plug connection of the kind specified above, as well as a retaining part for such a plug connection, in such a way that the assembly and disassembly can be further simplified, while retaining the advantages of the known locking principle as well as the low danger of detachment of the retaining part, and, namely, also in applications in which only a very small surrounding space is available.

According to the principles of the invention, this is achieved for the plug connection and the retaining part by configuring the collars of the retaining part with different size and/or shape in such a way that a collar, which abuts against the retaining bar of one coupling part in assembled state, releases this retaining bar of the coupling part with an outward radially elastic movement of the retaining section out of the assembled state, while the other collar still engages at least in some areas behind the retaining bar of the other coupling part, against which it abuts.

It can be especially provided in this way that one of the two collars has a cam-like, circumferentially running, preferably additionally radially inwardly curved attachment piece, through which it differs in size and shape from the other collar and by which it protrudes with respect to the other collar seen in axial projection.

The advantages of the known generic locking principle are combined, on the one hand, with the advantages of the snap-fit principle in the plug connection according to the invention. If the retaining part is undetachably preassembled on the one coupling part, the other coupling part only needs to be axially inserted for assembly, which makes possible an easy, fast, convenient and secure automated or single-hand assembly.

There is no need, on the other hand, to carry out a highly space-consuming radial displacement for disassembly of the retaining part in the embodiment according to the invention when the connection is disengaged, which is of particular advantage at assembly locations with only small surrounding space in radial direction.

A radial expansion, which suffices to again axially draw out a coupling part from the connection, can preferably be produced at the retaining part by actuating or pressing the pressure-loaded area or by drawing or levering with a tool by engaging in an elastic area located circumferentially between two retaining sections. The retaining part according to the invention can preferably at the same time remain axially fixed and is thus retained in an annular groove of the coupling part via cam-like projections on the greater of the two collars of the retaining sections, which additionally engages behind the retaining bar of the other coupling part against which it abuts in assembled state.

BRIEF DESCRIPTION OF THE DRAWINGS

The invention will be described in more detail with reference to several preferred exemplary embodiments depicted in the drawings, wherein:

FIG. 3 shows an axial section through the embodiment of a coupling part configured as a plug part of a plug connection, wherein the sectional planes in the two figure halves—similarly as in FIG. 1—are offset, and namely, for example, by 45°;

FIG. 4a shows a plan view of the embodiment of a retaining part of a plug connection represented in FIGS. 1, 5 and 6;

FIG. 4b shows a sectional view running through the central plane IV-IV of the retaining part;

DETAILED DESCRIPTION

Figure 1:
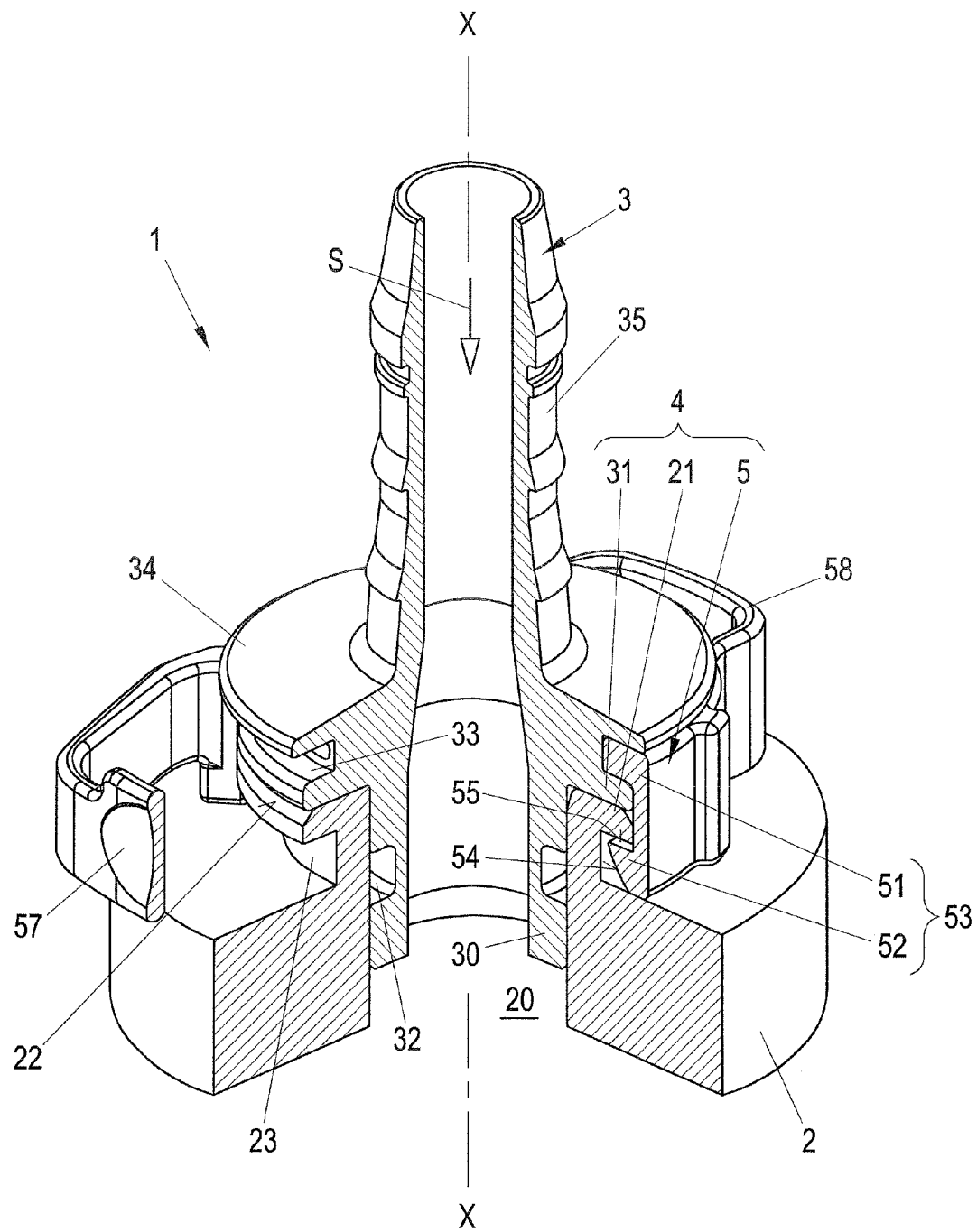
FIG. 1 shows a perspective view in partial section of a plug connection according to the principles of the invention with a first embodiment of a retaining part with inserted and locked state of the coupling parts.

It is expressly emphasized with regard to the following description that the invention is not limited to the exemplary embodiments and at the same time also not to all or several of the features of the described feature combinations, but rather each individual partial feature of each exemplary embodiment can also be of inventive importance per se and also in combination with any of the features of another exemplary embodiment separately from all other partial features described in connection therewith.

The same parts are always provided with the same reference characters in the different figures of the drawings and for this reason, as a rule, need only to be described once.

A plug connection 1 according to the invention, which can especially be used for connecting fluid lines, comprises two intermateable coupling parts 2, 3, which are inserted into each other in the assembled state represented in FIG. 1 and can be detachably locked in this state via a locking device 4. The two intermateable coupling parts 2, 3 are in particular a socket part 2 and a plug part 3, which can be axially inserted (axis X-X) in a sealing manner in a receiving opening 20 of the socket part 2 with a plug shaft 30 and are retained there in inserted state by means of the locking device 4. The two coupling parts 2, 3 can both be preferably made of plastic.

The locking device 4 consists, on the one hand, of two outer radial flange-like retaining bars 21, 31 of the two coupling parts 2, 3, which are axial in inserted state and adjacent in insertion direction (arrow S) and, on the other hand, of a retaining part 5. The retaining part 5 can also be advantageously configured as a plastic molded part, in particular for use with low fluid pressures, wherein a thermoplastic elastomer material can also be used, for example.

An annular groove 32 can be provided, into which a peripheral seal (which is not depicted), in particular in the form of a sealing ring, can be introduced—as shown in FIGS. 1, 3, 7, 8 and 9—preferably on the plug shaft 30, in order to seal the plug connection 1.

Figure 7:
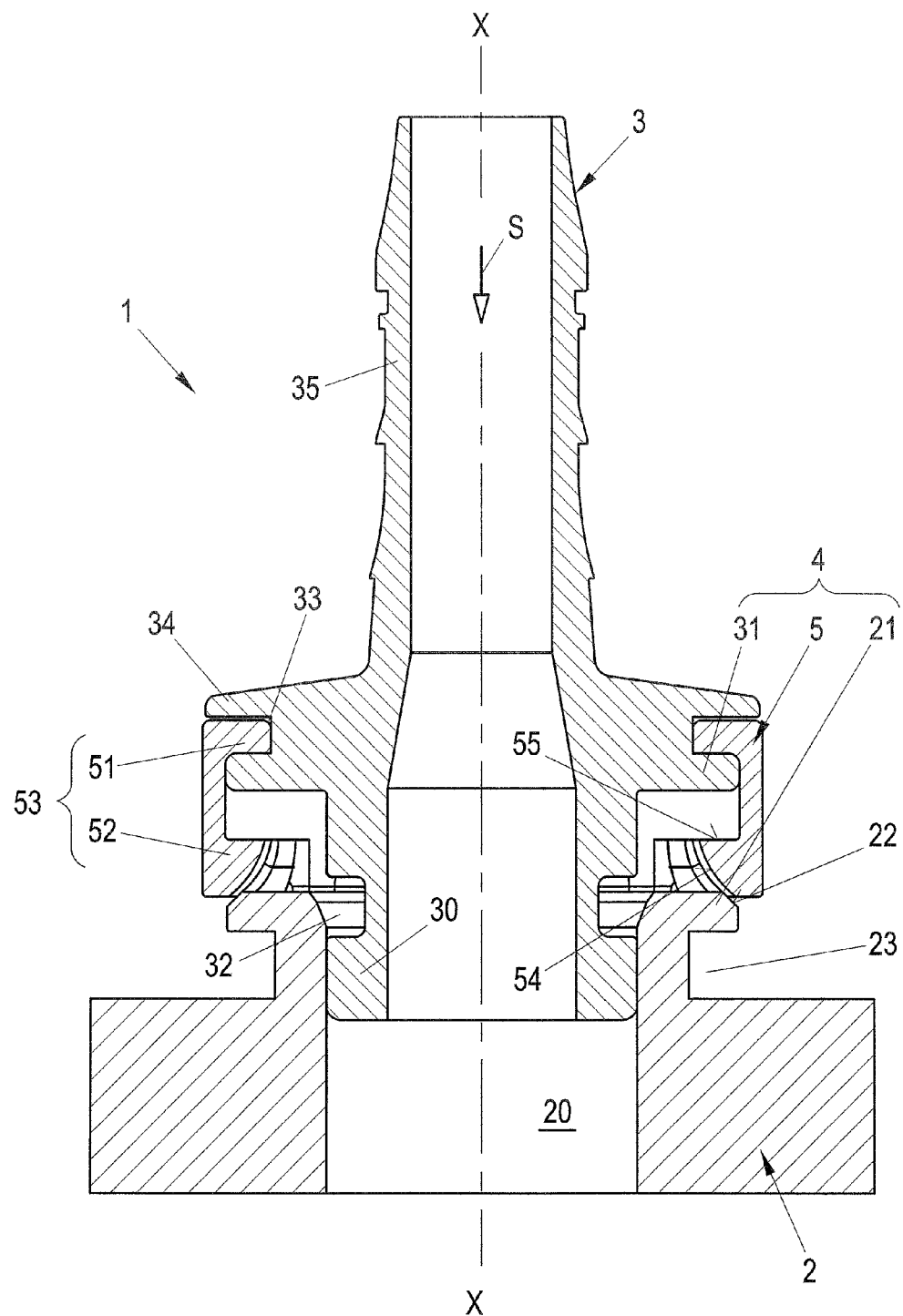
FIG. 7 shows a sectional axial view during assembly of the plug connection in preassembled state represented in FIG. 1.
Figure 8:
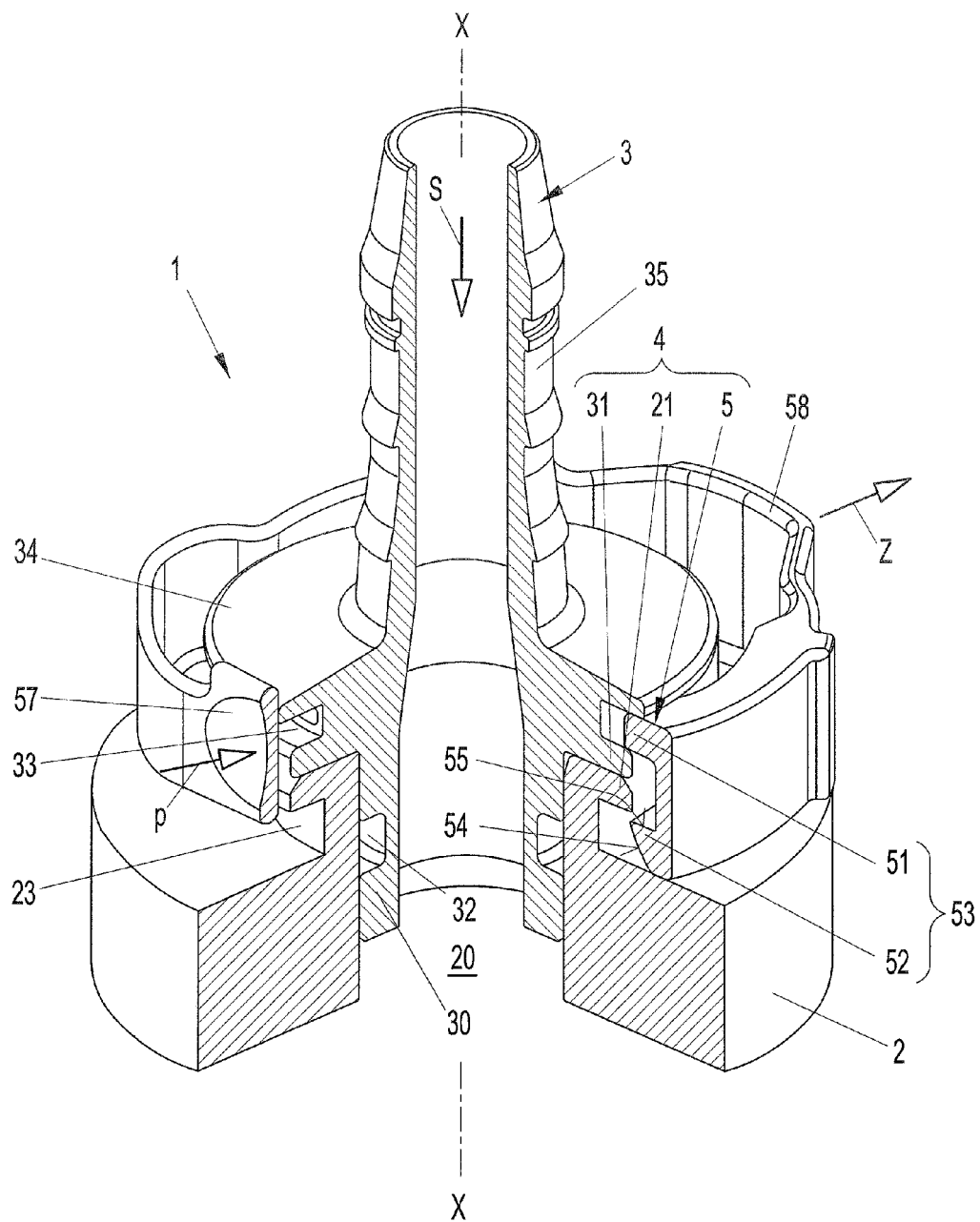
FIG. 8 shows a partial sectional perspective view of the plug connection represented in FIG. 1 during disassembly.

The retaining part 5, which is represented in FIGS. 1 and 2, 4a and 4b, as well as 5 to 12 in a first embodiment, has a closed annular peripheral contour, which is not described in detail, and which in a preassembled state shown in FIG. 7 can be axially and radially fixed and undetachably assembled on one of the two coupling parts 2, 3—in the shown embodiments on the plug part 3. First a resilient expansion, then a slipping of the retaining part 5 over the coupling part 2, 3, and a subsequent resilient return to the original shape of the ring can take place for this purpose. The undetachability of the retaining part 5 is ensured at the same time by means of the closed ring shape. Because the retaining part 5 encompasses one of the coupling parts 2, 3 at an angle of 360°, that is, completely, an additional retaining element is advantageously not necessary.

From the representation of the assembled state shown in FIG. 1 it is evident that the retaining part 5 has at least one radially elastically moving retaining section 53 with a C-shaped axial section having two collars 51, 52, which after the assembly positively axially and radially encompass the retaining bars 21, 31 of the two coupling parts 2, 3. In all of the represented embodiments two retaining sections 53 (refer to FIGS. 2, 4*a*, 4*b*, 10 to 12) are provided which are symmetrical with reference to a longitudinal axis Y1-Y1 of the retaining part 5 and diametrically opposite to each other on a transversal axis Y2-Y2, respectively, wherein however a greater number of retaining areas can be made available also by means of an optional circumferential segmentation of the retaining sections 53.

Figure 2:
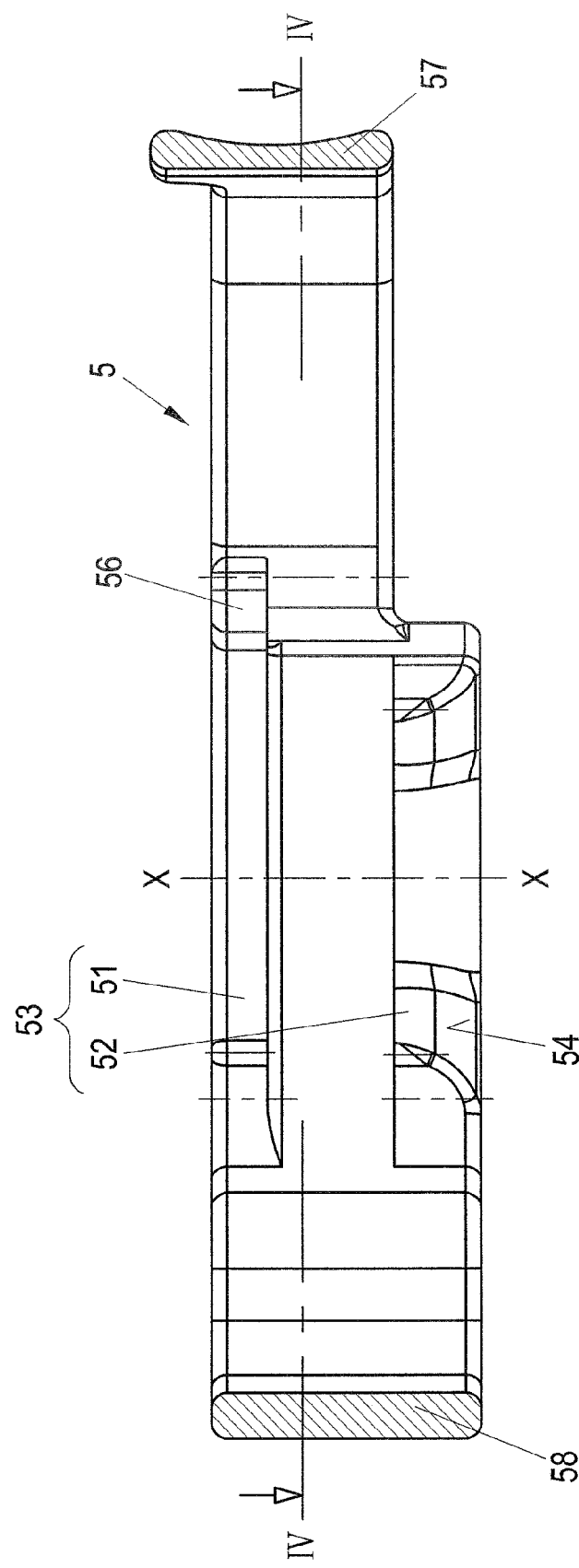
FIG. 2 shows an enlarged longitudinal section (along axis Y1-Y1) of the embodiment of a retaining part of a plug connection represented in FIGS. 1, 5 and 6.
Figure 5:
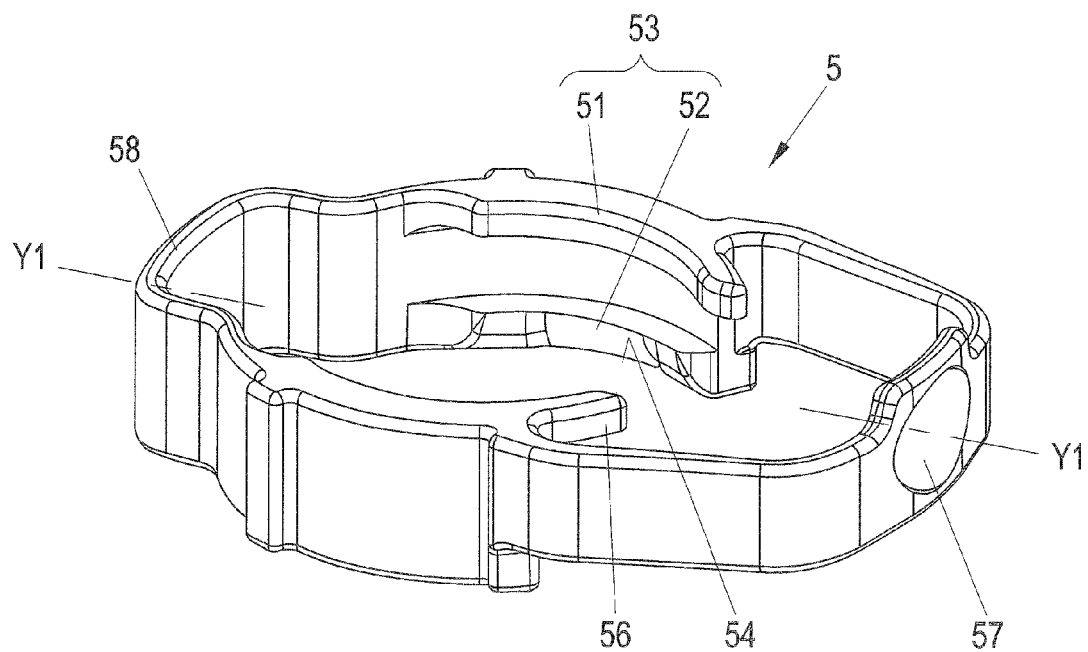
FIG. 5 shows a perspective plan view of the first embodiment of a retaining part according to the invention of a plug connection.
Figure 6:
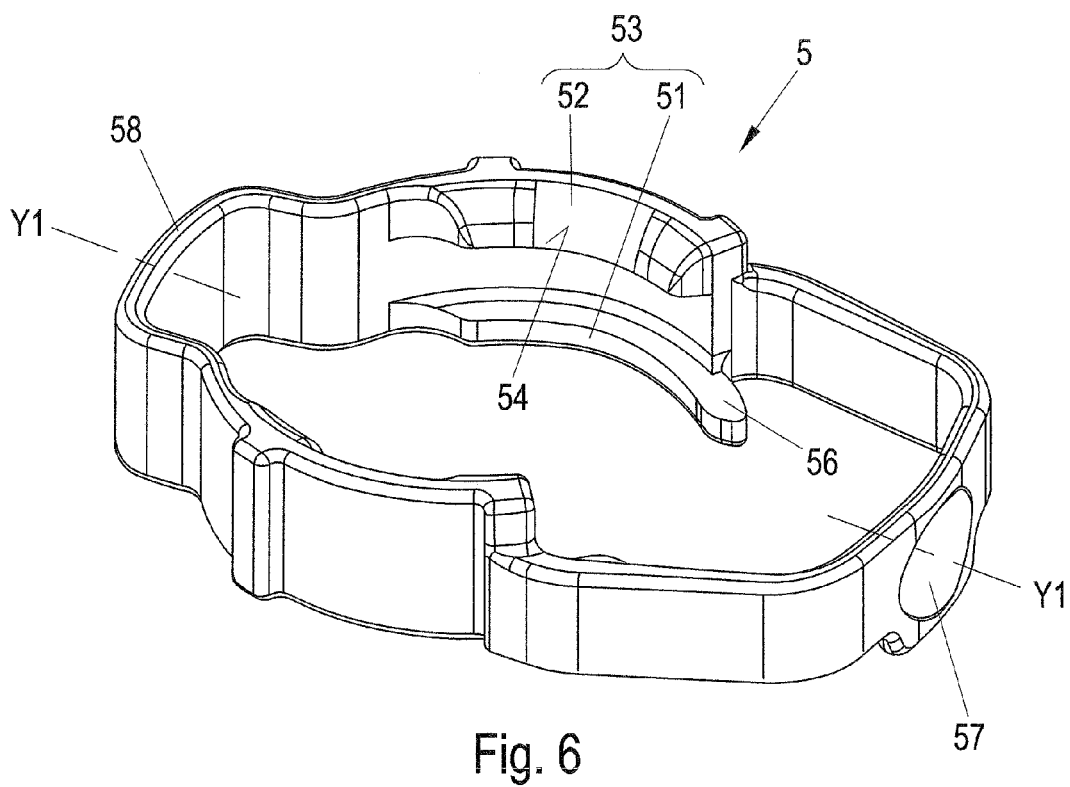
FIG. 6 shows a perspective bottom view of the retaining part represented in FIG. 5.

An exemplary embodiment of the first collar 51 of the upper retaining section 53 of FIGS. 1, 2 and 5 can be very clearly seen in FIG. 4*a*, and an exemplary embodiment of the second collar 52 of FIGS. 1, 2 and 5 can be seen in FIG. 4*b*. In all of the represented embodiments are provided respectively two such collars 51, 52, which are located diametrically opposite to each other, as is particularly shown by means of the respective perspective individual representations of the different embodiments of the retaining element of FIGS. 5, 6, 15, 17, 19 and 22 to 25.

The second collar 52 of each retaining section 53 of the retaining part 5 is configured as a locking element with a radial inner angular face 54, which can preferably be configured convex and rests on the side facing toward the socket part 2 during the insertion procedure. If—as shown in FIG. 7—the plug part 3, on which the retaining part 5 is preassembled, is inserted along the axis X-X into the receiving opening 20 of the socket part 2 for the assembly that ends with a locking, this angular face 54 acts like a spreading face for the retaining part 5 or, more precisely, for its second collar 52.

Because the spreading face 54 glides relative to a counter spreading face 22 of the retaining bar 21 acting as counter locking element, a radially outward directed spreading movement of the retaining part 5 transversely to the axis X-X is carried out around a radial spreading path under the action of an assembly force during insertion around a specific axial assembly path. After the end of the spreading path has been reached, the collar 52 engages behind the retaining bar 21 of the socket part 2 in a positively locking way with a radial retaining edge 55, so that a positive lock connection acting in insertion direction S is configured, as is shown in FIG. 1. When the coupling parts 2, 3 are intermated, the retaining section 53 is moved radially outward by means of the retaining bar 21 moving relative thereto and lockingly encompasses with a C-shape the retaining bars 21, 31 of the two coupling parts 2, 3 after a subsequent inward radial return movement in inserted state.

A particularly preferred configuration can adapt a contour of the spreading face 54 facing the counter spreading face 22 with respect to a counter contour of the counter spreading face 22 facing the spreading face 54 in such a way that the spreading path changes in a non-linear fashion to at least partially overproportional, proportional and/or subproportional during insertion in dependence upon the assembly path, especially within different assembly phases. The maximum applicable assembly force can be reduced in this way, on the one hand, during the insertion in that the optimized assembly path-assembly force characteristic allows a reduction of the height of the assembly force peaks occurring during insertion. It is possible, on the other hand, to achieve a uniform distribution of the work to be applied for assembly throughout the entire insertion procedure. It is advantageously possible at the same time to shorten the entire assembly path in comparison to a configuration with planar spreading face 54, which especially leads to advantages from the point of view of a minimization of the necessary installation space.

Figure 12:
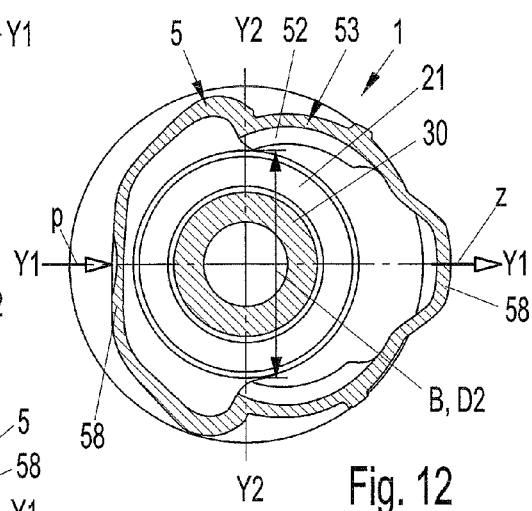

In the plug connection 1 according to the invention or for the retaining part 5 according to the invention, it is provided that the collars 51, 52 in the retaining section 53 of the retaining part 5 are configured with different size and/or shape in such a way that a collar 52, which abuts against the retaining bar 21 of the one coupling part 2 in assembled state, is released with an outward radial elastic movement of the retaining section 53 from the assembled state, while the other collar 51 once more engages at least by sections behind the retaining bar 31 of the other coupling part 3, against which it abuts. This configuration according to the invention is shown in particular in FIGS. 8 to 12. FIG. 12 shows at the same time in particular the release of the retaining bar 21 of the socket part 2 by means of the lower, second collar 52, and FIG. 10 as well as 11 shows a new arrangement of the upper, first collar 51 on the shaft 30 of the plug part 3.

As shown in the respective individual representations of the retaining part 5 in FIGS. 2, 4*a*, 4*b*, 5 and 6, 15, 17, 20 and 22 to 25, the closed ring shape of the retaining part 5 in undeformed state can especially have an egg-shaped or elliptical basic shape, in which the retaining sections 53 are located on the longitudinal sides.

Figure 10:
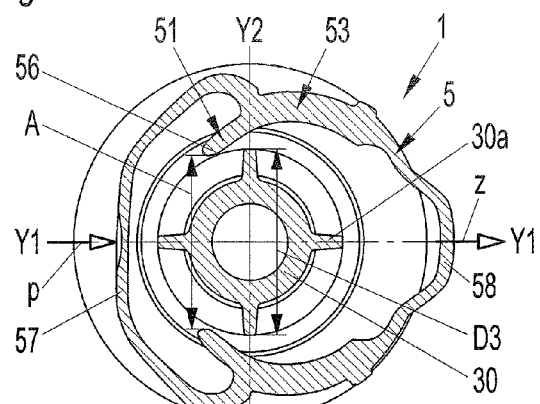
FIGS. 10 to 12 show different sectional representations of the plug connection during disassembly according to the section lines X-X, XI-XI and XII-XII of FIG. 9.
Figure 11:
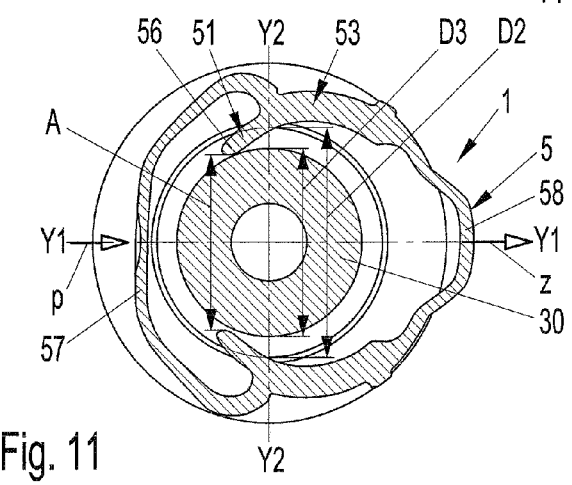

The collars 51, 52 of the respective retaining section 53 can preferably have a sickle shape, as shown, for example, in FIGS. 4*a* and 4*b*, so that they positively encompass the shaft 30 of the plug part 3, preferably in the area of a peripheral groove 33 of the plug part 3, and the socket part 2 below its retaining bar 21, that is, on the side facing away from the plug part 3, preferably in the areas of the peripheral groove 23 of the socket part 2 in assembled state. The representation of FIG. 3, and in particular the section of FIG. 10, shows at the same time that ribs 30*a* can be provided in the peripheral groove 33—in the sense, on the one hand, of an advantageous reduction in mass and thus a material savings, but on the other hand, however, simultaneously also as stable embodiments.

For a preassembly fixation of the retaining part 5, the corresponding coupling part 2, 3, preferably the plug part 4—as shown in FIGS. 1 and 3 as well as 7 to 9—can have an additional annular fixing web 34 in order to form the peripheral groove 33, which accommodates the corresponding radial collar 51 of the retaining part 5. The latter can preferably have a diameter that is greater than the diameter of the retaining bar 31. The diameter of the retaining bar 31 corresponds instead preferably approximately to an inner diameter of the retaining area 53 in an internal surface area between the collars 51, 52.

It can be easily determined by means of a comparison of FIGS. 4*a* and 4*b* that the two collars 51, 52—seen in plan view—can preferably be configured to be congruent—with the exception of the cam-like circumferentially running optional additionally slightly radially inwardly curved attachment piece 56 of the upper, first collar 51, by which the collar 51 protrudes with respect to the lower, second collar 52. The upper first collar 51 envelops the plug part 3 by means of this attachment piece 56 in assembled state over a larger angular area than the lower second, collar 52 envelops the socket part 2.

In other words: An angle at center µ1, which is spanned in the assembled state between the start and end of the area of the first collar 51, which has a fixing effect (FIG. 4a), is greater than a corresponding angle µ2 of the second collar 52 (FIG. 4b). The upper collars 51 of the retaining areas 53 consequently always extend—that is, after preassembly, after assembly and also during disassembly—over a peripheral angle µ1, which is dimensioned at least in such a way that a distance A between the attachment pieces 56 (refer in particular to FIGS. 10 and 11 for disassembly) is always smaller in the maximum spread state with regard to its clear opening width, than the respectively corresponding diameter D2, D3 of the corresponding coupling part 2, 3—in the present case the diameter D3 of the plug part 3 in the area of its peripheral groove 33.

Expressed in more generalized terms: The retaining part 5 according to the invention is dimensioned in such a way that one of the two collars 51, 52 has a cam-like, circumferentially running, preferably additionally radially inwardly curved attachment piece 56, by means of which it is differentiated in size and shape from the other collar 52, 51 and by which it protrudes—seen in axial projection—with respect to the other collar 51, 52. If two similarly configured collars 51, 52 are present, the collar 51 extends with the attachment piece 56—after preassembly of the retaining part 5 on one of the two coupling parts 2, 3 as well as also after assembly with both coupling parts 2, 3 and during disassembly of the retaining part 5—over a peripheral angle µ1 of at least one coupling part 2, 3, which is dimensioned in such a way that the distance A between the attachment pieces 56 of two diametrically opposite collars 51 is always smaller in the maximum spread state of the collar 5 than a diameter D2, D3 of the coupling part 2, 3 against which the collar 51 abuts.

At the transverse sides of the retaining part 5 can be configured elastic actuation areas 57, 58, namely pressure loaded area/face 57 and tensile area 58, preferably circumferentially between the collars 51, 52 of the retaining section 53, in which a radial expansion of the retaining section 53, which is sufficient to again draw out a coupling part 2, 3—in the present case a socket part 2—axially from the connection, can be brought about by actuating or pressing a pressure-loaded area 57 (pressure arrow p in FIGS. 8 to 12) or by drawing or levering with a tool by engaging in a tensile area 58 (drawing arrow z in FIGS. 8 to 12) during disassembly.

A clear minimum distance B located within the transverse axis Y2-Y2, which is present between the corresponding collars 52 during disassembly, is greater than the corresponding diameter D2, D3 of the coupling part—in the present case greater than the diameter D3, D3 of the socket part 2 in the area of its peripheral groove 23. The retaining part 5 is axially fixed and retained at the same time on the largest collar 51 in the annular groove 33 of the coupling part 3 via the attachment pieces 56, which additionally engages behind the retaining bar 31, 32 of the other coupling part 3, 2—in the present case the plug part 3—against which it abuts in assembled state (and also in preassembled state).

Figure 9:
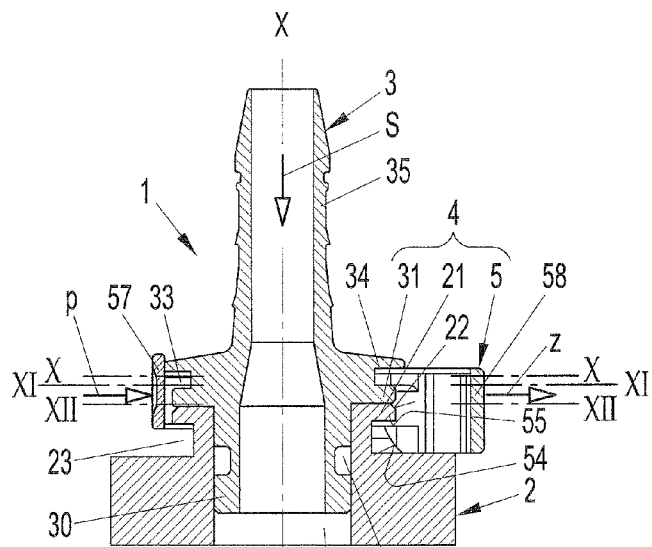
FIG. 9 shows a sectional view of the plug connection shown in FIG. 7 in reduced scale with respect to FIG. 7 during disassembly.

The actuation areas 57, 58 can preferably form stops, which when moved in the direction of the longitudinal axis Y1-Y1 of the retaining part 5 come to rest against the coupling part 3, in particular its shaft 30, for example—as shown in FIG. 9—the actuation area 57 located in the left figure half on the fixing web 34 of the shaft 30, and thus correspondingly limit the spreading movement of the retaining part 5 according to the invention, that is, its radial expansion or the radial elastic outward movement of each retaining section 53. A resilient return of the retaining sections 53 into a position like the one before deformation is easily possible in this way after the applied pressure and/or tensile load is withdrawn. Provided the other coupling part 2 has been withdrawn, the preassembled state is again present.

The preassembly fixation of the retaining part 5 is carried out—at least in the embodiment according to FIGS. 1 to 12 after an axial sliding of the single-piece retaining part 5 on the coupling part 3—by means of a positive radial snapping of its retaining areas 53 on the coupling part 3, wherein the retaining part is spread to its maximum in the area of its retaining areas 53 through an actuation within at least one of the actuation areas 57, 58. An angle of wrap of the retaining areas 53 greater than 90° is then available after preassembly for the coupling part, while this angle is obtained as double the value of the angle of wrap µ1 [angle at center µ1] represented in FIG. 4a.

Figure 23:
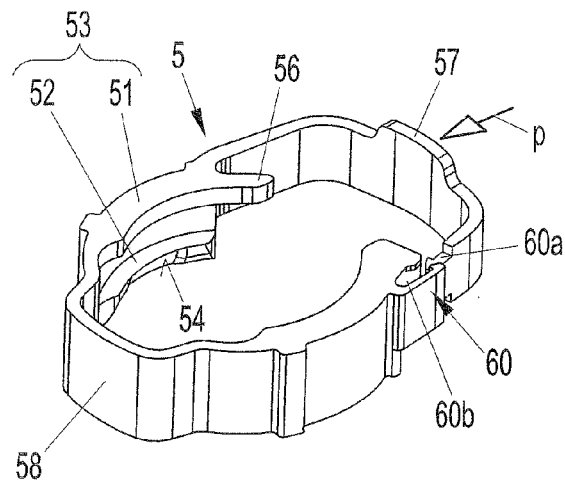
FIG. 23 shows a perspective plan view of a fourth embodiment of the retaining part in a representation similar to that of FIG. 20.
Figure 24:
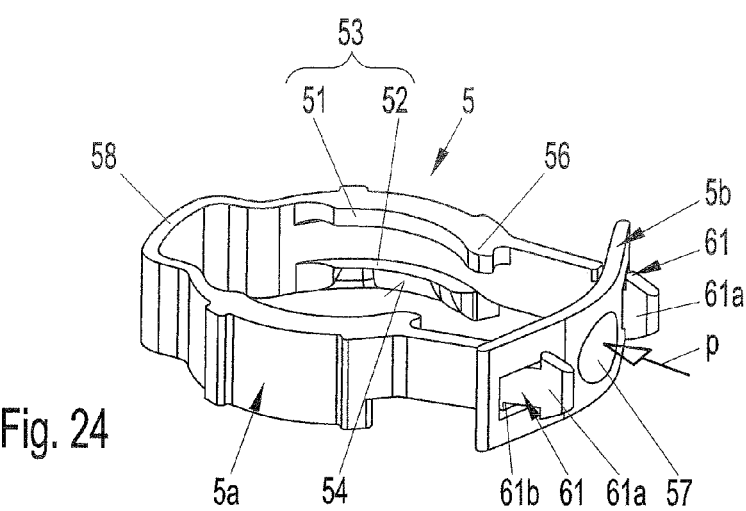
FIG. 24 shows a perspective plan view of a fifth embodiment of the retaining part in a representation similar to that of FIG. 5.
Figure 25:
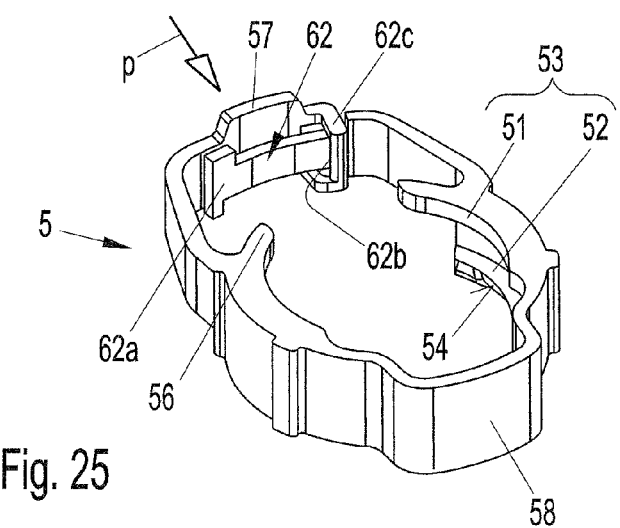
FIG. 25 shows a perspective bottom view of a sixth embodiment of the retaining part in a representation similar to that of FIG. 23, but from another viewing angle.

In FIGS. 13 to 17 is represented a second embodiment according to the invention of a retaining part 5. In FIGS. 18 to 22 is represented a third embodiment, and in FIGS. 23 to 25 are represented a fourth, fifth and sixth embodiment. With these embodiments (except for the third) it is advantageously also possible to carry out the preassembly fixation of the retaining part 5 without axially sliding the retaining part 5 on the coupling part 2, 3, because the retaining part 5 consists either of two especially mutually detachably and/or articulately connected individual parts 5a, 5b (second and fifth embodiment) or an individual part, which is provided however with at least a lock with preferably positive locking and/or force fitting action, via which its closed annular contour can be opened (fourth and sixth embodiment).

Figure 13:
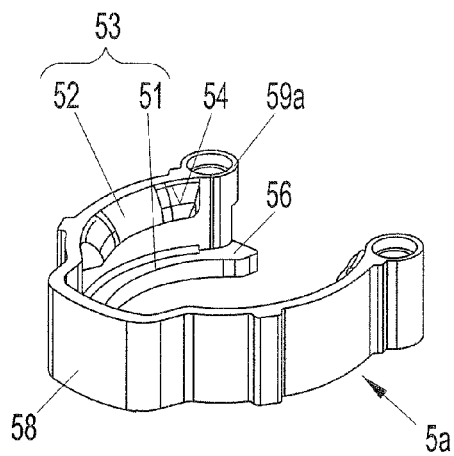
FIG. 13 shows a perspective bottom view of a first ring part of a second embodiment of a retaining part of a plug connection according to the principles of the invention.
Figure 14:
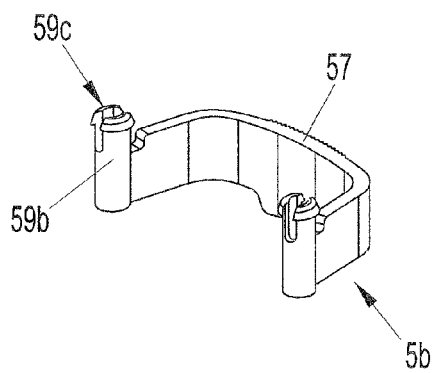
FIG. 14 shows a perspective bottom view of a second ring part of the second embodiment of a retaining part of a plug connection.
Figure 15:
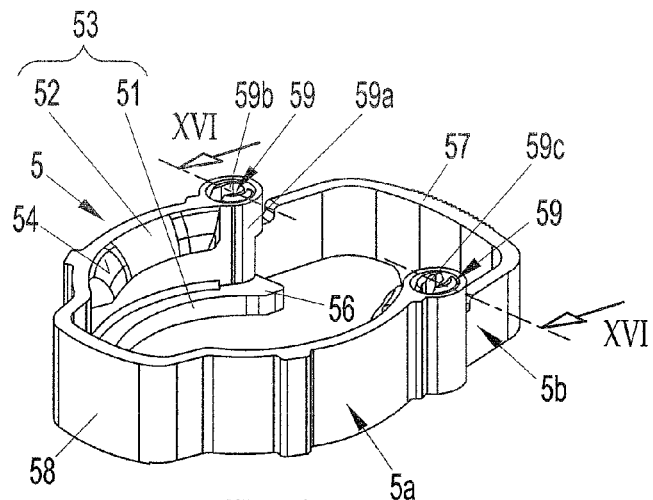
FIG. 15 shows a perspective bottom view of the second embodiment of the retaining part formed by the ring parts represented in FIGS. 13 and 14.
Figure 16:
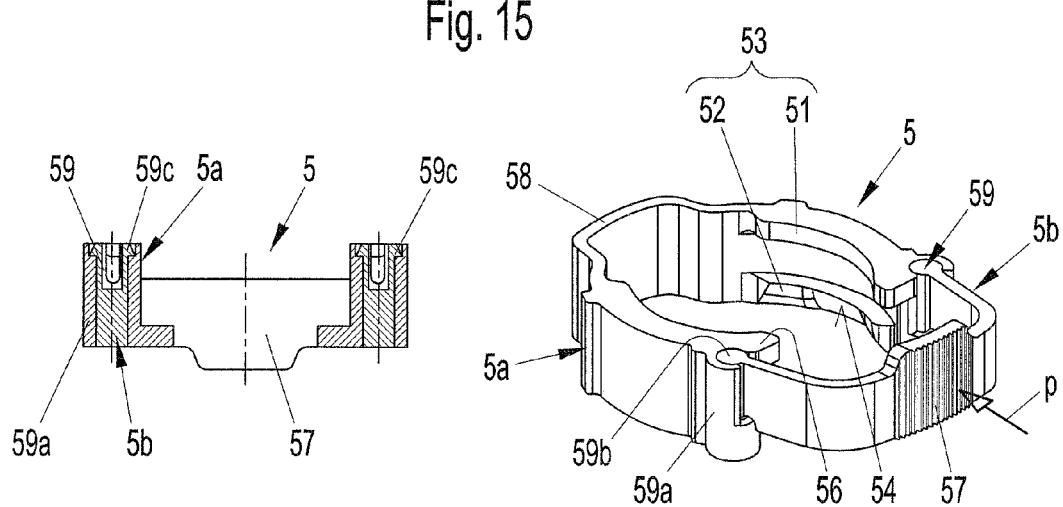
FIG. 16 shows a sectional representation of the retaining part along line XVI-XVI of FIG. 15.
Figure 17:
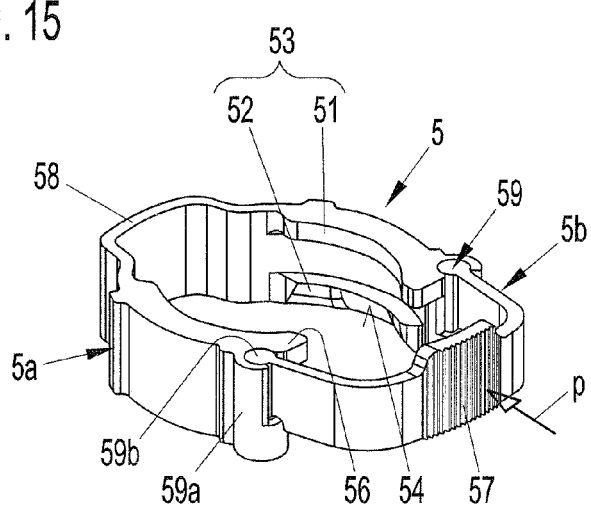
FIG. 17 shows a perspective plan view of the second embodiment of a retaining part of a plug connection similar to the one shown in FIG. 5.

In the second embodiment, the retaining part 5 consists of two mutually detachably connectable individual parts 5a, 5b, which are shown separately in FIGS. 13 and 14 or in assembled state in FIGS. 15 to 17, respectively. A detachability is, however, not necessarily required or to be provided for a conventional utilization of a retaining part 5 according to the invention. The C-shaped retaining area 53 is at the same time within the first individual part 5a (FIG. 13), while the second individual part 5b (FIG. 14), which can advantageously be snapped into the first individual part 5a, forms one of the two actuation areas 57, 58, in particular the actuation area with the pressure-loaded face 57.

The articulated joints 59 facilitate the spreading of the retaining part 5, wherein the second individual part 5b can in this way be made of a less elastic material, that is, a material with greater rigidity or greater modulus of elasticity. It is thus less deformed under an actuation pressure p than the corresponding actuation area 57 of the first embodiment.

The articulated joints 59 can be configured in particular as hinged joints, wherein the hinge bush 59a is located on the one individual part 5a and the hinge pin 59b is located on the other individual part 59b of the retaining part 5. The hinge pins 59b can have—as can be especially seen in FIG. 14—a stop head 59c in the preferred embodiment, by means of which they can be attached in the hinge bushes 59a by means of a simple snapping. This attachment, by means of which the individual parts 5a, 5b are connected to the retaining part 5, is depicted in particular in FIGS. 15 and 16.

Figure 18:
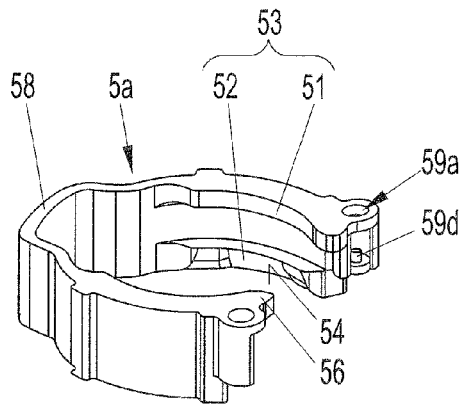
FIGS. 18 and 19 show two perspective plan views from different viewing angles of a first individual part of a third embodiment of a retaining part of a plug connection.
Figure 19:
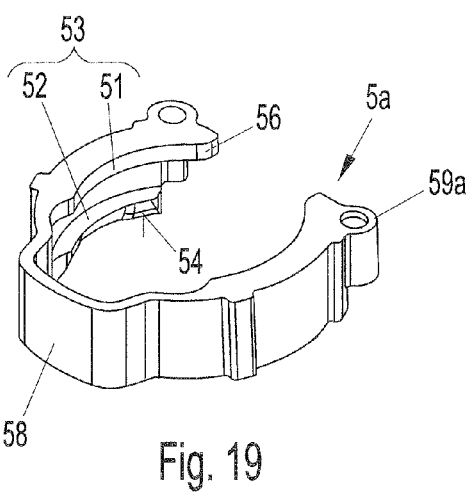
Figure 20:
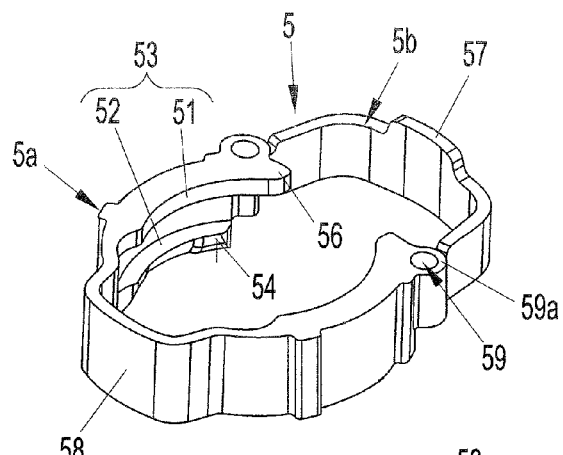
FIG. 20 shows a perspective plan view of the third embodiment of the retaining part formed by the individual part represented in FIGS. 18 and 19 in a representation similar to that of FIGS. 5 and 17.

In the third embodiment of the invention (FIGS. 18 to 22), the retaining part 5 likewise consists of two individual parts 5a, 5b, which can be connected to each other via hinge-like articulated joints 59, of which one is shown separately in different views in FIGS. 18 and 19. The peculiarity of the retaining part 5 with reference to the second embodiment consists in that the individual parts 5a, 5b are manufactured in a two component injection molding process, while FIGS. 20 to 22 again show the retaining part 5 as a whole in different views. The first individual part 5a forms at the same time a preform from the first component, in or on which the second individual part 5b consisting of the second component is injected. The two individual parts 5a, 5b preferably do not adhere to each other after injection, which can be achieved, for example, by applying a corresponding release agent on the surface of the preform or by means of a corresponding material selection of the components.

Figure 21:
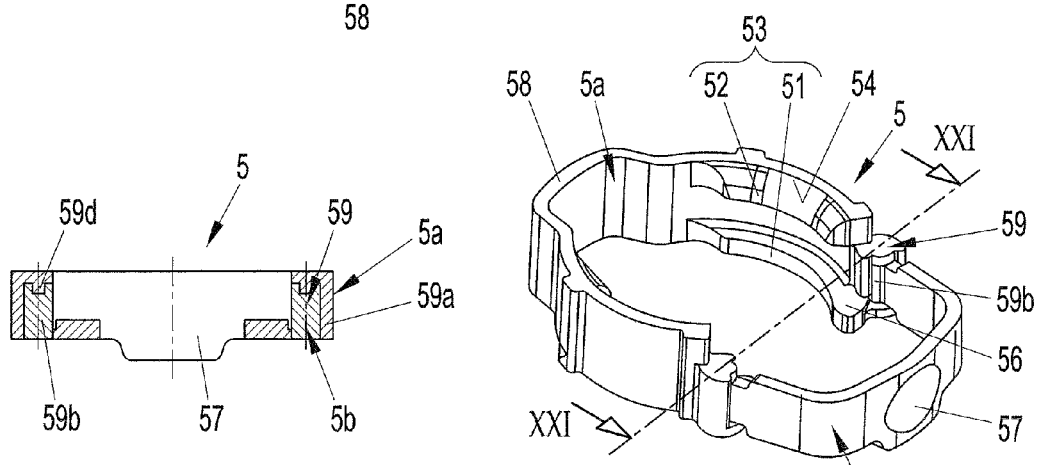
FIG. 21 shows a sectional representation of the retaining part along line XXI-XXI of FIG. 22.
Figure 22:
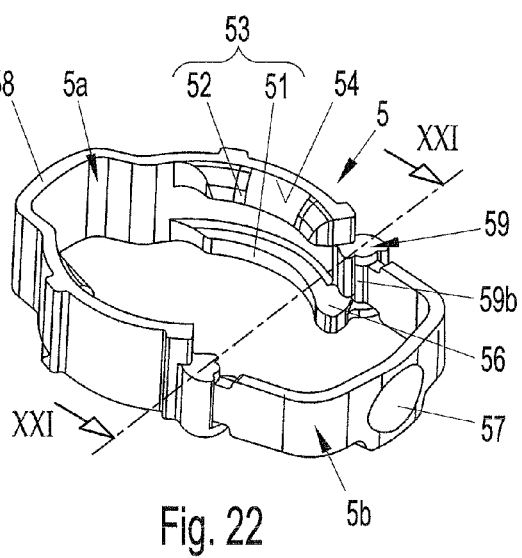
FIG. 22 shows a perspective bottom view of a third embodiment of the retaining part in a representation similar to that of FIG. 15, but from another viewing angle.

In particular a comparison of the sectional representations of FIGS. 16 and 21 as well as the representation of FIG. 18 shows that in the first individual part 5a, in which the C-shaped retaining area 53 is located, is also located in turn the hinge bush 59a, while the latter is closed however on one side and an additional retaining pin 59d is configured axially in the locking area—in the manner of a fishing rod—which is encompassed by the material of the second individual part 5b in the finished state. This connection is not detachable.

As already mentioned, the fourth embodiment of the retaining element represented in FIG. 23 consists of a single part having a lock 60, via which its closed annular contour can be opened. This lock 60 is configured as a snap lock, while a mushroom-like mandrel 60a, which protrudes in particular in the back from the pressure-loaded face 57, interacts with a complementary configured snap opening 60b, which is located in particular in the area of a cam-like projection 56. Two such locks can be provided, in particular in axial symmetrical arrangement, when the unity is waived. The lock can be purely positive locking or force fitting.

The retaining part 5 consists also in the fifth embodiment of two mutually connectable individual parts 5a, 5b, of which in turn the first individual part comprises retaining sections 53 and the second individual part comprises the pressure-loaded face 57. The second individual part 5b is configured as a yoke, which can be attached or is attachable via two force fitting acting locks 61 to the first individual part. Free ends 61a of the first individual part 5a configured as barbs can be elastically twisted and guided through openings 61b of the yoke in order to produce these locks 61. After the ends 61a are twisted back, the barb ends block the opening and prevent a detachment of the individual parts 5a, 5b from each other, as shown in FIG. 24.

A bolt lock 62, which likewise acts in a positive locking manner, is provided in the sixth embodiment of a retaining part 5 according to the invention shown in FIG. 25. A bolt part 62a can be guided through an opening 62b, which is located in a locking section 62c of the retaining part, which protrudes in particular at the rear side from the pressure-loaded face 57, in order to produce the lock 62. The bolt part 62a is formed in turn—similarly as in the fifth embodiment—by means of a free end 61a with barb-like configuration of the first individual part 5a. In a preferred alternative mode of production, the locking mechanism 62a, 62b, 62 can already be molded in locking position—as shown in FIG. 25—in the original molding process of the retaining part 5, that is, preferably in an injection molding process, and must for this reason not be detachable.

Figure 26:
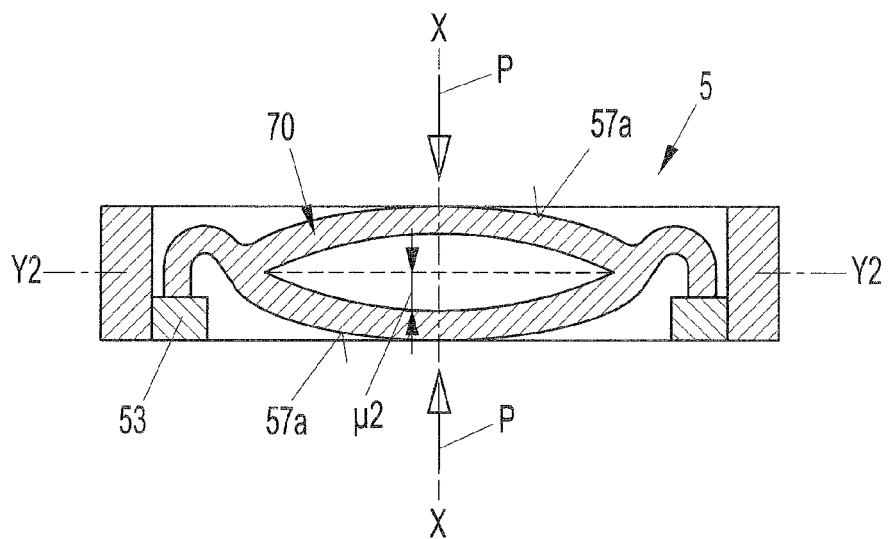
FIG. 26 shows a seventh embodiment of the retaining part in a section according to line XXVI-XXVI of FIG. 27.
Figure 27:
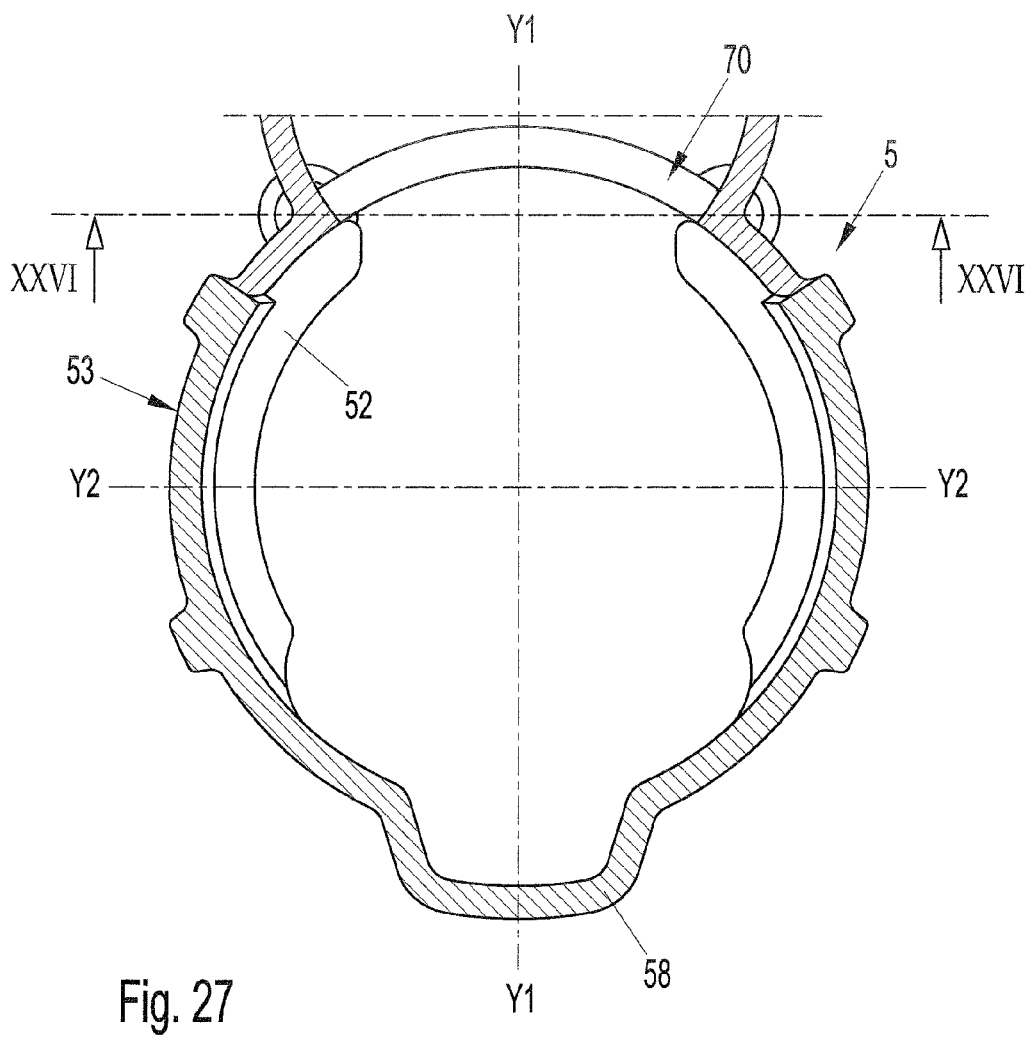
FIG. 27 shows the seventh embodiment of the retaining part in a representation similar to that of FIG. 4b, but enlarged and rotated.

In contrast to all previously described embodiments of the retaining part 5 according to the invention, in which the elastic actuation areas 57, 58 are configured on the transverse sides of the retaining part 5 between the retaining sections 53, the seventh embodiment of a retaining part 5 according to the invention represented in FIGS. 26 and 27 relates to a retaining part design, in which takes place an actuation or pressing on at least one pressure-loaded face 57a—two such pressure-loaded faces 57a (pressure arrows p in FIG. 26) are represented—whereupon the applied pressure is not within the plane of the spreading movement, but is essentially vertical thereto. A rubbery elastic bracket part 70 based on the scissors principle is used herein, which—as shown in FIGS. 26 and 27—is connected or can be connected to the retaining section 53. Since the actuating deformation is not applied within the horizontal plane Y1-Y1 (FIGS. 10 to 12) on this bracket part 70, but within the vertical plane X-X (FIG. 26), the retaining part 5 can be advantageously configured with a shorter longitudinal extension (axis Y1-Y1) with respect to the previously described embodiments.

Figure 28:
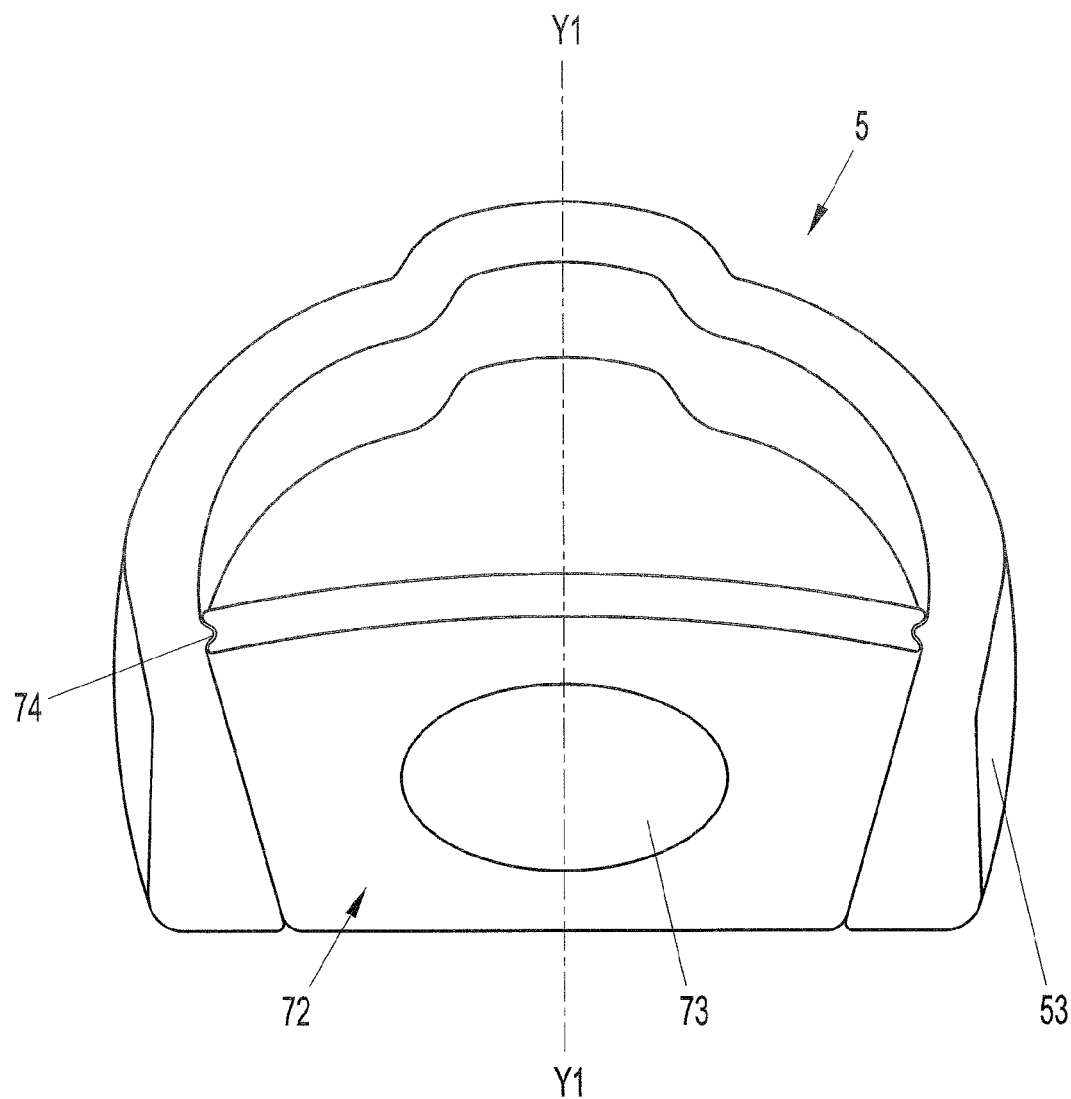
FIG. 28 shows an eighth embodiment of the retaining part in a representation similar to that of FIG. 27.

The same is the case in the eighth embodiment represented in FIG. 28. An actuation wedge 72 is used herein, which can be displaced in vertical direction X-X by applying pressure—in particular with a thumb—on a finger actuating recess 72 provided therefor as actuation area. The guide 74 of the actuating wedge 72 in the retaining section 53 can be preferably configured at the same time as a dovetail guide. The spreading can be carried out via an inclined plane with locking function.

As already evident from the previous embodiments, the invention is not limited to the represented and described exemplary embodiments, but also comprises all of the embodiments having the same effect in the sense of the invention. In deviation from the represented and described embodiments, in which the retaining part 5 is preassembled on the plug part 3 and consequently coaxially encompasses the plug shaft 30, a corresponding preassembly of the retaining part 5 on the socket part 2 can of course also be provided. A preassembled structural unit of a retaining part 5 configured according to the invention and a coupling part 2, 3, as described for the plug connection 1 according to the invention, is thus likewise attributed an independent inventive importance.

It should be noted at this point that, in kinematic reversal, it is also possible to design an angular face on the retaining bar 22 of the socket part 2 in correspondence with the spreading faces 54 in order to achieve the described insertion force optimization when spreading the retaining part 5.

The coupling parts 2, 3 can furthermore have basically any desired connecting elements on their sides opposite to the plug connection side. The plug part 3 has a connecting pin 35 for a fluid line (pipe or tube) in the represented embodiment. The socket part 2 does not possess a specific configuration, but can have, for example, a screw-in socket, wherein however also at least one of the coupling parts 2, 3, as is preferred the socket part 2, can also be directly configured (as one piece) on the specific units.

The invention is so far also not limited to the feature combinations defined in the claims 1 to 13, but can also be defined by means of any desired combination of specific features of the totality of the disclosed individual features. This means that basically practically each individual feature of the independent claims can be omitted or replaced by at least one of the individual features described at an another point of the application. The claims are to be understood in this respect as a first formulation attempt of an invention.

The invention claimed is:

1. A plug connection for fluid lines, comprising two intermateable coupling parts, which in an inserted state can be releasable locked via a locking device including two outer radial retaining bars of the two coupling parts and a retaining part, the retaining bars being adjacent in insertion direction (S) and axial (X-X) in inserted state, the retaining part having a closed annular peripheral contour, in a preassembled state the retaining part is axially and radially fixed and undetachably assembled on one of the two coupling parts and in an assembled state the retaining part axially and radially encompasses the retaining bars of the two coupling parts, the retaining part encompassing the retaining bars with at least one radially elastically moving retaining section with a C-shaped axial section, the C-shaped axial section having two collars spaced apart and axially interconnected by an attachment piece so as to be axially projectable upon each other, the collars being configured with at least one of a different size and shape in such a way that during radial elastic movement of the retaining section outward from the assembled state one of the collars releases an adjacent one of the retaining bar while the other of the collars still engages and abuts at least in some areas the other of the retaining bars, the other of the collars having a circumferentially running, radially inwardly curved attachment piece seen in axial projection protruding with respect to the one of the collars, the other of the collars differing in size and shape from the one of the collars by way of the attachment piece, wherein the collars are similarly configured collars and after preassembly of the retaining part on one of the two coupling parts as well as also after assembly with both coupling parts and during disassembly of the retaining part, the attachment piece extends over a circumferential angle of at least one coupling part that is dimensioned in such a way that a distance (A) between the attachment pieces of two diametrically opposite sides of the other collar is always smaller in a maximum spread state of the retaining part than a diameter of the coupling part against which the collar having the attachment piece abuts.

2. The plug connection of claim 1, wherein one of the collars configured as a locking element, the collar configured as a locking element having a radial inner angular face that rests on a side facing toward the coupling part during the insertion procedure, the angular face causing a radially outward directed spreading movement of the retaining part as a result of the movement relative thereto of the retaining bar of the coupling part during insertion, wherein the one of the collars engages with a radial retaining edge behind one the retaining bars in a positively locking way after locking.

3. The plug connection of claim 2, wherein the angular face when moving relative to a counter spreading face of the retaining bar causes a spreading movement of the retaining part transversely to the axis (X-X) around a spreading path under the action of an assembly force during insertion, wherein a contour of the angular face facing toward the counter spreading face is adapted in that the spreading path changes in a non-linear fashion during insertion.

4. The plug connection of claim 1, wherein the retaining part is preferable configured as a one-piece elastic ring, which has at least two C-shaped retaining sections located on the longitudinal sides in radially symmetrical peripheral distribution.

5. The plug connection of claim 1, wherein the one coupling part is a plug part and the other coupling parts is a socket part, the collars of the retaining section have a sickle shape positively encompassing an annular groove on a shaft of the plug part and a peripheral groove on the socket part in the assembled state.

6. The plug connection of claim 1, wherein the collars differ in at least one of size and shape and that in the assembled state one of the collars encompasses an adjacent one of the coupling parts over an angular range that is greater than an angular range encompassed by the other of the collars with respect to the other of the coupling parts.

7. The plug connection of claim 1, wherein the retaining part includes two retaining sections and elastic actuation areas are circumferentially configured between the two retaining sections, a radial expansion of the retaining sections is produced in a longitudinal axis (Y1-Y1) of the retaining part during disassembly by actuating one of the elastic actuation areas.

8. The plug connection of claim 7, wherein one of the actuation areas is a pressure loading area and another of the actuation areas is a tensile loading area.

9. The plug connection of claim 7, wherein the actuation areas form stops that limit outward radial elastic movement of each of the retaining sections by abutting against one of the coupling parts.

10. The plug connection of claim 8, wherein one of the coupling parts is a plug part having a shaft and the actuation areas abut against the shaft.

11. The plug connection of claim 1, wherein an actuation element is arranged between two retaining areas and a radial expansion of the retaining sections can be brought about during disassembly by actuating the actuation areas in a direction of a vertical axis (X-X) defined by the retaining part.

12. The plug connection of claim 1, wherein a circumferential annular groove is axially formed in one of the coupling parts.

13. The plug connection of claim 12, wherein one of the coupling parts is a plug part having a shaft with the retainer bar and a fixing web ring formed thereon, the circumferential annular groove being formed between the retaining bar and the fixing web ring.

14. The plug connection of claim 1, wherein the retaining part includes two, detachable, mutually connected individual parts.

15. The plug connection of claim 1, wherein the retaining part includes two articulated, mutually connectable individual parts.

16. The plug connection of claim 1, wherein the retaining part has at least one lock with positive locking action for opening and locking its closed annular peripheral contour.

17. The plug connection of claim 16, wherein the lock is one piece.

* * * * *